United States Patent [19]

Lindner

[11] 4,177,749
[45] Dec. 11, 1979

[54] DEMOUNTABLE TWO-COMPONENT ROADWAY SIGNAL ASSEMBLY

[75] Inventor: Henry Lindner, Elgin, Ill.

[73] Assignee: Beatrice Foods Co., Elgin, Ill.

[21] Appl. No.: 969,708

[22] Filed: Dec. 15, 1978

[51] Int. Cl.² ............................ E01F 9/10; G02B 5/12
[52] U.S. Cl. .................................... 116/63 T; 350/97; 404/10
[58] Field of Search ................. 116/63 T, 63 R, 63 P; 404/10; 350/97; 40/612

[56] References Cited

U.S. PATENT DOCUMENTS

| | | | |
|---|---|---|---|
| 3,212,415 | 10/1965 | Byrd | 404/10 |
| 3,766,881 | 10/1973 | Ward | 404/10 X |
| 3,806,234 | 4/1974 | Brudy | 116/63 T X |
| 3,934,541 | 1/1976 | May et al. | 116/63 T |

Primary Examiner—Daniel M. Yasich

Attorney, Agent, or Firm—Hill, Van Santen, Steadman, Chiara & Simpson

[57] ABSTRACT

A wind resistant collapsible roadway signal assembly adapted for carrying in collapsed configuration in a truck, car, or the like for assembly and positioning along a roadway as a warning sign or the like when and if a vehicular breakdown occurs. The signal assembly includes an elongated base construction and a sign assembly supported therefrom. The sign assembly is demountably associated with the base construction; when assembled, the sign assembly upstands from a mid-portion of said base construction, and when disassembled, the sign assembly nests in an adjacent, parallel relationship relative to said base construction, all with the sign assembly so demountably associated with said base construction. A single resilient finger integral with the base construction functions both to lock the sign assembly position relative to the base construction and to demountably engage the sign assembly with the base construction.

11 Claims, 10 Drawing Figures

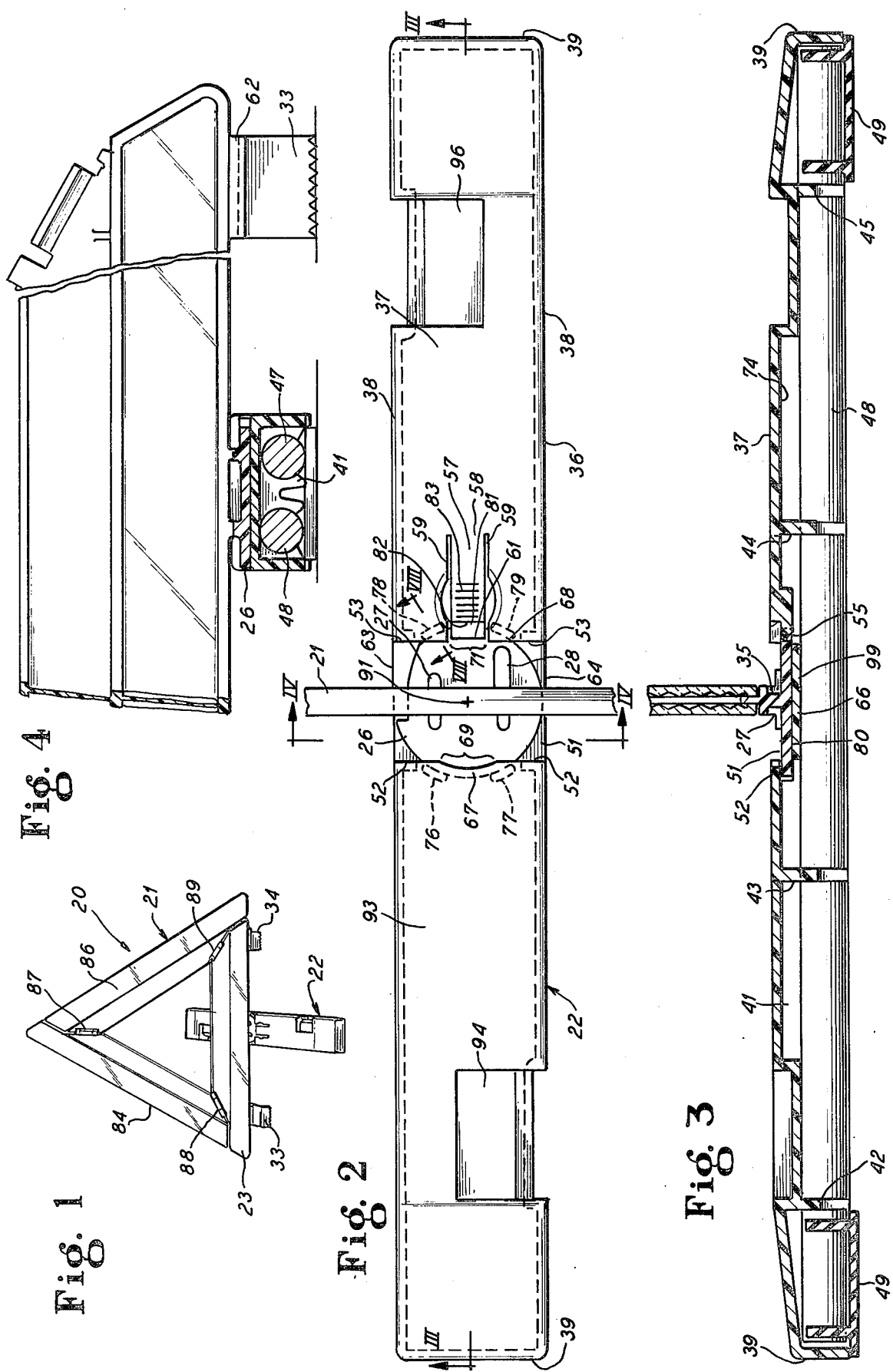

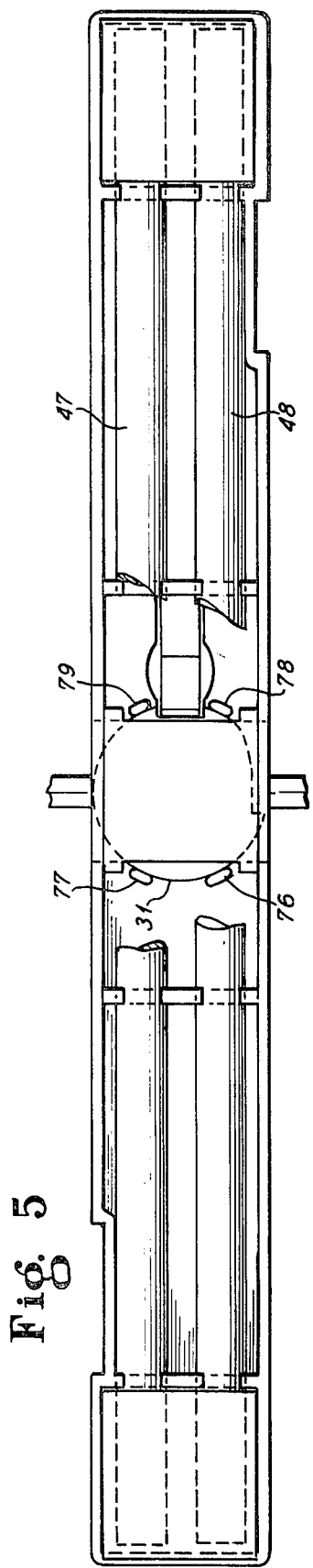
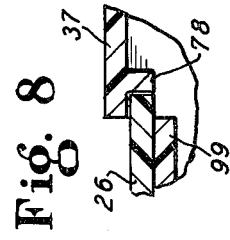
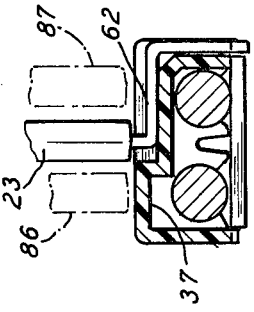
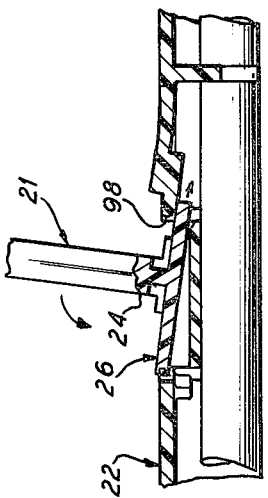
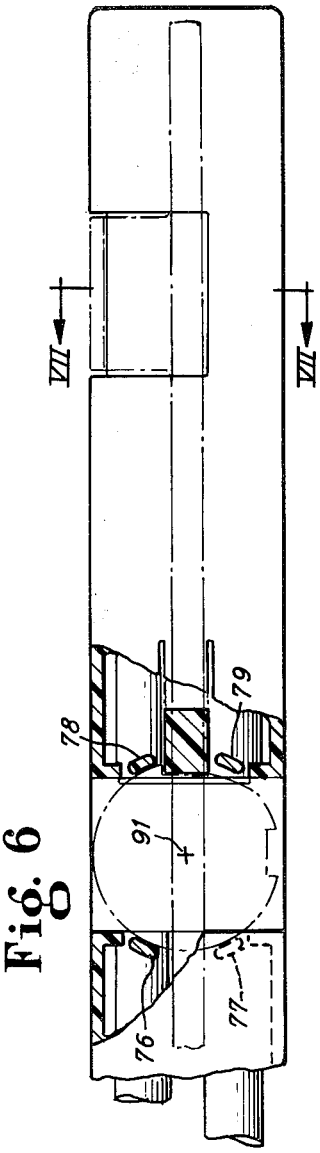
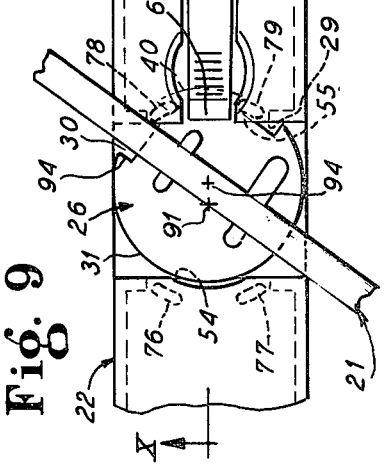

DEMOUNTABLE TWO-COMPONENT ROADWAY SIGNAL ASSEMBLY

BACKGROUND OF THE INVENTION

Warning sign devices, particularly those having a triangular appearance and adapted to be assembled into an upright position from a collapsed, storage configuration have come into extensive use, particularly by trucks and truck drivers, since the issuance of United States Government Motor Vehicle Safety Standard No. 125 (effective Jan. 1, 1974). Such a structure is shown for example in Lindner and Kennedy U.S. Pat. No. 3,773,012 (issued Nov. 20, 1973).

Various mounting means have been used to support such a warning sign device in an upright position for use. One such mounting means is taught by Lindner and Kennedy U.S. Pat. No. 3,863,880 (issued Feb. 4, 1975). Actual field usage of such combinations of such warning devices with such mounting means has revealed that they all suffer from a common failing: Wind blowing against an assembled such warning sign device tends to cause same to move and to assume such a configuration relative to the associated base member that the entire assembled combination collapses. This problem is of such proportions that the State of California has now adopted standards and regulations which, in effect, require that all new warning devices sold in that State must have a mounting support assembly capable of holding the warning sign device in an upright, operable position indefinitely against strong surface winds.

So far as I am aware, prior to my present invention, no support assembly was known which would meet the State of California requirements for wind resistance in such combinations, and, at the same time, still provide collapsibility (storageability) for the entire assembly of warning device and support assembly.

Also, so far as I am aware, prior to my present invention, combination of mounting support and warning sign device was known which would permit the warning sign device to be detachably secured to the mounting support without adversely affecting wind resistance requirements such as those set by the State of California. Such detachability is desirable in order to permit replacement of the warning sign device without having to replace the mounting support (should, for example, the warning sign device be accidentally broken in use).

BRIEF SUMMARY OF THE INVENTION

More particularly, the present invention is directed to a two-component type roadway signal assembly comprised of a base construction and a sign assembly detachably associated together. This signal assembly is wind resistance, collapsible, and adapted to maintain the sign assembly in an upright configuration relative to the base construction when the signal assembly is assembled. A single resilient finger integral with the base construction cooperates with a portion of the sign assembly so that not only is the sign assembly lockable in a desired configuration relative to the base construction at opposite limits of pivotal movement of the sign assembly when assembled with the base construction, but also the sign assembly is detachable from the base construction, all by simple pivotal movements of such finger.

The signal assembly is typically of rugged construction for great durability and long life. The base construction is adapted for use, if desired, with a wide variety of warning sign assemblies. The base construction is also adopted for use on a wide variety of supporting surfaces of the types which can occur on and along highways, roadways, and the like.

The present invention provides a collapsible roadway signal assembly which meets high standards for stability and support against wind forces applied against warning signs held thereby, including the standards set by the State of California.

This invention further provides a wind resistant, collapsible roadway signal assembly of the class indicated wherein the base construction is readily and simply detachable from the sign assembly.

This invention further provides such a demountable, two-component, collapsible roadway signal assembly which has a relatively simply construction, is economical to manufacture, is rugged, and requires substantially no maintenance.

Such signal assembly is simple to use, fool-proof and fail-safe to a high degree, and reliable.

Other and further objects, purposes, advantages, aims, utilities, features and the like will be apparent to those skilled in the art from a reading of the present specification taken together with the drawings.

BRIEF DESCRIPTION OF DRAWINGS

In the Drawings:

FIG. 1 shows a perspective view of one embodiment of a demountable two-component collapsible roadway signal assembly of the present invention;

FIG. 2 is an enlarged, top plan view of the base construction employed in the embodiment of FIG. 1, portions of the warning sign assembly being broken away, the signal assembly being in the assembled configuration shown in FIG. 1;

FIG. 3 is a longitudinally taken, vertical sectional view taken along the line III—III of FIG. 2;

FIG. 4 is a fragmentary, partially sectionalized view in side elevation taken along the line IV—IV of FIG. 3;

FIG. 5 is a bottom plan view of the base construction shown in FIG. 2, some parts thereof broken away;

FIG. 6 is a fragmentary, enlarged plan view of the base construction employed in the FIG. 1 embodiment, but showing the sign assembly assembled and configured parallel to the base construction, in phantom lives, some parts of the base construction being broken away, and some parts thereof being shown in section;

FIG. 7 is a fragmentary transverse sectional view through the base construction taken along the line VII—VII of FIG. 6;

FIG. 8 is an enlarged detail fragmentary sectional view taken along the line VIII—VIII of FIG. 2, illustrating the manner in which the base construction interlocks with the sign assembly when the signal assembly has the assembled configuration shown in FIG. 1;

FIG. 9 is a fragmentary detailed top plan view of the base construction with the assembled sign assembly being pivoted relative thereto preparatory to detaching the sign assembly from the base construction; and FIG. 10 is a fragmentary, detailed view of the base construction similar to FIG. 3 but showing the properly oriented sign assembly being detached from the base construction.

DETAILED DESCRIPTION

Turning to the drawings, there is seen in FIG. 1 an embodiment of a roadway signal assembly 20 of the present invention which is herein designated in its entirety by the numeral 20. Signal assembly 20 comprises a sign assembly 21 and a base construction 22.

Sign assembly 21 incorporates a bottom portion 23 which preferably is characterized by having a generally straight bottom side 24. While the sign assembly 21 can generally be of any desired construction, a preferred sign assembly used in the practice of the present invention is flattened when in an assembled or used configuration, and also is itself collapsible and foldable when in a disassembled or storage configuration without being detached from base construction 22. One particularly preferred form of sign assembly has a triangular perimeter when assembled and is adapted to be positioned and held in an upright position after assembly from a collapsed, storage configuration; see; for example, the above referenced U.S. Government Motor Vehicle Safety Standard No. 125. A particularly preferred class of such triangular warning device, and techniques for the manufacture thereof, are described in, for example, Lindner and Kennedy U.S. Pat. No. 3,773,012 (issued Nov. 20, 1973), but see also Lindner and Kennedy U.S. Pat. No. 3,970,033 (issued July 20, 1976), and Lindner and Kennedy U.S. Pat. No. 3,918,795 (issued Nov. 11, 1975), all the disclosures of which are fully incorporated by reference into the present disclosure and specification.

Sign assembly 21 is provided with a disc member 26 which is disposed in spaced, parallel relationship to bottom side 24 of bottom portion 23. Connecting support 35 interconnects the disc member 26 to a mid region of bottom side 24. Preferably, and as shown in the drawings, the disc member 26 is additionally secured to adjacent bottom side 24 by the brace supports 27 and 28. Regions of the edge 31 thereof are thus on spaced open relationship to bottom portion 23. The disc member 26, the bottom portion 23, the support 35 and the brace supports 27 and 28 are preferably of one piece modled plastic construction, suitable exemplary plastics being ABS, polyolefin, polyester, polyamide, or the like, as those skilled in the art will readily appreciate. Alternatively, the disc member 26 can be secured with supports to bottom side 24 by gluing, welding, separate fastening means (e.g. screws) or the like, as desired, depending upon the particular type of fabrication material being employed in any given use situation. Characteristically, disc member 26 has a slot 29 formed in a portion of the circumferential edge region 31 thereof. About 90° from slot 29 circumferentially about edge 31 a second slot 30 is formed in edge 31. However, that portion of the edge 31 of disc member 26 which would otherwise form the side of slot 30 adjacnet slot 29 is removed together with associated material of disc member 26 defining a short straight relief segment 96 thereof whose projected edge outline is shown by dotted line 40 in FIG. 9.

A pair of L-shaped, flattened leg members 33 and 34 downwardly depend from bottom side 24 of bottom portion 23. Leg connecting means for mounting leg members 33 and 34 to bottom portion 23 as in a plastics molding operation using connecting segments 62 (pair). Alternatively, the legs 24 and 26 can be glued, screwed (as with screws not shown), or the like, to a bottom portion 23. Each leg member 33 and 34 is adjacent a different opposite end region of bottom portion 24, and each leg member 33 and 34 has a longitudinally flattened (relative to bottom portion 23) side extending walls which extends in an opposed side direction relative to the other thereof so as to adapt a sign assembly 21 for pivoting relative to base 22 in the preferred embodiment of the present invention herein shown and described.

The base construction 22 includes a housing 36. Housing 36 has a platform plate 37 with integral downturned side wall flanges 38 (paired) and down-turned end wall flanges 39 (paired). Platform plate 37, side wall flanges 38 and end wall flanges 39 together define a bottomly open chamber 41.

Housing 36 is preferably so constructed as to include a plurality of longitudinally spaced, transversely extending (between side wall flanges 38) bulkheads 42, 43, 44 and 45. Platform plate 37 is optionally downwardly tapered adjacent the opposed end wall flanges 39. To provide ballast means, chamber 41 is fitted with a pair of spaced, parallel metallic rods 47 and 48 which extend longitudinally and interiorly within the chamber 41 and which terminate in spaced relationship to the end wall flanges 39. Bulkheads 42-45 are shaped to accomodate the rods 47 and 48, and to retain the ballast rods 47 and 48 in chamber 34. The desired combination of bulkheads 42-45 and rods 47 and 48 can alternatively be achieved during such a single plastics molding operation by pre-positioning the rods 39 and 41 in the mold elements used in the plastics molding operation, if desired, as those skilled in the art will appreciate. However, as those skilled in the art will appreciate, any convenient form of ballast can be used in a base construction 22, including scrap metal (steel, alloys and the like). The optimum cross-sectional shape, of course, of rods 47 and 48 is primarily a matter of individual convenience and cost considerations. When scrap metal or the like is used as ballast, a housing can be provided with a bottom closure plate, or the like (not shown) for retaining such ballast interiorly within such a housing 36, such bottom plate being secured to the side and end walls of such housing by means of sonic welding, or the like, all as those skilled in the art will readily appreciate. A pair of separately formed plastic, preferably elastomeric, molded shoes 49 clip over the rods 47 and 48 adjacent the end wall flanges 39 to provide ground engaging base construction 22 portions which aid in permitting a base construction 22 to rest solidly upon a ground or floor area which has slight irregularities therein between opposed end regions of base construction 22, as those skilled in the art will appreciate.

Preferably, the platform plate 37 has a generally flattened outside face in the intermediate regions thereof, such as is provided in the embodiment shown, between bulkheads 42 and 45. It is preferred to utilize shoes 49 in a base construction 22 because such greatly enhance the resistance of a base construction 22 to sliding movements over a substrate surface, as those skilled in the art will appreciate.

The housing 36 is formed so that its platform plate 37 has defined therein across the midregion thereof a depression 51 which is open along its opposite sides 63 and 64 and which has a bottom 99 with a flat upper face 66 (the bottom being comprised of the material of housing 36, the depression 51, and its associated portions, preferably being formed in a single plastics molding operation). The opposite sides 67 and 68 of depression 51 are generally defined by the material of housing 36 except that slots 54 and 55 are defined in sides 67 and 68 intermediately between opposed side walls 38 transversely, and intermediately between the face 66 and the underside surface 74 of platform plate 37 vertically. Thus, overhanging flange or lip portions 52 and 53, comprised of edge portions of housing 36 adjacent slots 54 and 55, are produced which lip portions 52 and 53, respectively, are recessed in their mid portions 69 and 71 for extension therethrough of disc member 26, as is hereinafter explained. The underside surface 74 of platform plate 37 has formed therein so as to downwardly depend therefrom a plurality of bosses, here 76, 77, 78, and 79, respectively. The shape and location of these bosses 76–79 is such that, when the disc member 26 is positioned in depression 51 with its bottom face 80 in face to face contact with upper face 66, and with its edge regions 31 extending into slots 54 and 55, the bosses 76–79 guide the disc member 26 and limit its lateral movements relative to the housing 36, but still permit limited pivotal movements of disc member 26 relative to the housing 36.

An elongated longitudinally extending (relative to housing 36) resilient locking finger 57 is integrally defined in a mid-region of platform plate 37 adjacent the depression 51. Most preferably, the finger 57 is formed concurrently with the platform plate 37 and other molded components associated with housing 36 in a single plastics molding operation. Latching finger 57 is elongated in a longitudinal direction relative to platform plate 37 and is joined to platform plate 37 only at its root or terminal end region 58, the finger 57 being separated from the body of platform plate 37 along its opposed sides 59 (paired) and also at its forward end 61 (which end 61 is opposed to the root end 58). Thus, finger 57 is adapted for up and down flexural movements normally relative to platform plate 37, downwardly into chamber 41, through the application of pressure, as by a finger, or the like, applied in the region of forward end 61 on the top or exterior surface portion thereof, or upwardly away from chamber 41 through the application of a lifting force, applied as by a screw driver or the like, in the region of forward end 61 under the bottom surface portion thereof. The forward end 61 of finger 57 is located adjacent the mid region of slot 55 thereof, as is illustrated, for example, in FIG. 2. The forward end 61 is depressed or down set somewhat so that when finger 57 is in a relaxed configuration, the forward end 61 extends partially into the region of slot 55. The distance across the down set region from end 61 back towards end 58 is such that when the finger 57 is downwardly depressed with the disc member duly mounted in depression 51, a shelf 82 defined on the upper side transversely across finger 57 is adjacent the edge region 31 of disc member 26. A plurality of ridges 83 or the like are preferably defined across the upper face 84 of finger 57 in spaced, parallel relationship to one another to provide and mark a surface area for finger contact by the hand of an operator, and adjacent accomodating apertures 97 (paired) are formed in platform plate 37 adjacent ridges 83 preferably on opposed sides of finger 57, as shown.

Slot 30 in disc member 26 is so positioned relative to bottom portion 23 that, when disc member 26 is operably positioned in depression 51 and disc member 26 is pivoted relative to base construction 22 so that sign assembly 21 extends normally to base construction 22, the slot 30 is engaged with the end 61 of finger 57, thereby locking the disc member 26 (and its associated sign assembly 21) in a fixed position. In this position, the leg members 33 coact with the shoes 49 to stabilize the signal assembly 80 in its erected fully assembled configuration (see FIG. 1) against the action of wind, as desired, whether varied or steady. In this configuration, the interrelationship between platform plate 37, disc member 26, and bottom 99 in the region of boss 78 is shown in FIG. 8.

The supports 26 and 27, particularly when signal assembly 20 is in its erected configuration, tend to resist any twisting action between upright sign assembly 21 and the cross-wise extending base construction 22, such as possibly could occur with certain wind conditions.

It is important to restrain a signal assembly against rotational movement of assembled sign assembly to base for reasons of achieving the desired wind resistance of an assembled signal assembly. Commonly in the prior art, a sign assembly was rotatable relative to its base with the consequence that a type of rocking action was achievable, such as with variations in wind velocities causing such an assembled signal to rotate relative to one another which ultimately resulted in a disastrous collapse of the entire assembly.

It is a special feature and advantage of the present invention that embodiments of this invention are capable of being collapsed without disengaging the sign assembly 21 from the base construction 22. In the collapsed configuration, the sign assembly 21 is dissembled from its erected configuration as shown for example, in FIG. 1. Thus, the arms 84 and 86 are separated at hinge 87 and pivoted about respective hinges 88 and 89 until the arms 84 and 86 lie adjacent bottom portion 23 in a parallel relationship as illustrated in FIG. 7, for example.

In order to bring the disassembled combination of arms 86 and 87 with bottom member 23 into general longitudinal alignment with base construction 22 so that arms 86 and 87 with bottom member 23 overlie platform plate 37 in the manner shown in FIG. 7, for example, the sign assembly 21 is pivoted about its axis 91.

The pivoting is made possible by first depressing finger 57 into the region of chamber 41 by applying pressure against ridges 83 until the end 61 of finger 57 lies below the bottom face 80 of disc member 26 before pivoting is undertaken. This action disengages slot 29 from forward end 61. As the edge region 31 of disc member 26 rotates over the downset region 81, pressure against the ridges 83 can be released whereupon the forward end region 61 slides under adjacent portions of edge region 31 as disc member 26 pivots. The diameter of disc member 26 is such that edge region 31 can come into spaced adjacent relationship to shelf 82.

In signal assembly 20, the bottom side 24 of bottom portion 23 is preferably, and as shown in the drawings, located as near as conveniently practical to the front face 92 of disc member 26. In signal assembly 20, this distance is slightly greater than the thickness of platform plate 37 so that the slots 54 and 55 which accomodate the thickness of disc member 26 occur immediately below platform plate 37, while, at the same time, when disc member 26 is operably positioned in depression 51, the bottom side 24 is positionable in an adjacent, spaced relationship to the upper surface 93 of platform plate 37. The heights of supports 35, 29 and 28 are regulated to achieve such a distance. Such a minimum distance is desirable in order to impart structural strength to the sign assembly 21. However, when such a minimum distance is employed, it is necessary to provide in housing 36 pockets 94 and 96 for receipt therein of leg members 34 and 33, respectively when bottom portion 33 is longitudinally aligned with, base construction 22 and is centered over platform plate 37. Pockets 94 and 96 are conveniently formed in housing 36 in the molding or shaping operation used to form housing 36. As those skilled in the art will appreciate, though, other spacing arrangements of components can be achieved without departing from the spirit and scope of the present invention.

With finger 57 disengaged from slot 29, disc member 26 is rotatable about axis 91 until bottom portion 33 is so aligned with base construction 22, and leg members 34 and 33 are received into pockets 94 and 96. In this position, the side wall 94 of slot 30 abuts against the side of forward end 61. When arms 84 and 86 are folded to be along opposite sides of bottom portion 23, the collapsing of signal assembly 20 is complete, and the signal assembly is in a compact configuration well suited for storage in a vehicle, such as a truck or automobile, ready for immediate assembly and erection.

If and when it is desired to detach the sign assembly 21 from the coacting base construction 22, the finger 57 is moved upwardly, as by inserting a screw driver blade into either one of the apertures 97 and prying, with the forward end 61 aligned with either slot 29 or 30, until the under surface of end 61 is moved above front face 92, at which stage the disc member 26 is rotated about axis 91 until the configuration and position illustrated in FIG. 9 is achieved for disc member 26 relative to base construction 22. Once rotation of disc member 26 has thus been initiated, pressure on finger 57 can be released whereupon the forward end region 61 slides over adjacent portions of edge region 31 as disc member 26 pivots. In this position, the disc member 26 is translatable laterally relative to depression 51 so that the axis of disc member 26 is moved to location 94 as shown in FIG. 9 where the bosses 78 and 79 come into contact with portions of slot 29 and relief segment 96. The interrelationship between bosses 78 and 79, slot 29, and segment 96 is such that the translation distance for disc member 26 is sufficient to permit the edge region 31 to come into alignment with the curvature of mid portion 69. When such an alignment, as shown in FIG. 9 is achieved, the disc member can be tilted relative to face 66 and lifted out of the depression 51 and disengaged from overhanging lip portions 73 and from end region 61.

Attachment or mounting of sign assembly 21 to base construction 22 is achieved by reversing the procedure, starting out by aligning the disc member with the depression 51 so as to achieve the interrelationship between components illustrated in FIG. 9. To facilitate this mounting, the undersurface of end region 61 is preferably provided with a bevel 98, as shown (see, FIG. 10, for example); thus an adjacent edge portion of disc member 26 is readily hooked under and then moved (translated) under end region 61 until the bosses 78 and 79 contact disc member 26 at which location, the disc member is tilted past the curvature of mid portion 69, followed by translation of edge region 31 under overhanging lip portions 72.

Those skilled in the art will appreciate that other arrangements of edge discontinuities in a disc member 26 (but including appropriate slots for engagement with the end of the locking finger 57) can be employed in the practice of this invention besides that illustrated herein without departing from the spirit and scope of this invention, together with other arrangements of bosses, slots, overhanging lips, opposed surface configuration of disc member, and the like. Although the teachings of my invention have herein been discussed with reference to specific elements and embodiments, it is to be understood that these are by way of illustration only and that others may wish to utilize my invention in different designs or applications.

I claim:

1. A portable wind-resistant, demountable collapsible signal assembly comprising
   (A) an elongated base construction,
   (B) a sign assembly having a bottom portion with a bottom side,
   (C) said sign assembly further having a disc member disposed in a spaced, parallel relationship to said bottom side, and having disc connecting means mounting said disc member to a mid-region of said bottom side, said disc member having edge discontinuities defined in selected circumferential edge portions thereof, said edge discontinuities including a first slot and a second slot spaced circumferentially approximately 90° from said first slot, said disc member having upper and lower surface portions,
   (D) said sign assembly further including a pair of flattened leg members which downwardly extend from said bottom side, and leg connecting means mounting said pair of leg members to said bottom side with each one of said leg members being generally in the region of a different opposed end region of said base portion,
   (E) said base construction comprising
      (1) a housing having a platform plate with integral, inturned side and end flanges which together with said platform plate define a chamber,
      (2) ballast means disposed in said chamber, including ballast retaining means therefor,
      (3) said platform plate having a depression defined in an upper mid portion thereof, with opposed recesses having overhanging lip portions along side edge portions of said depression the interrelationship between said recesses, said lip portions, and said depression being such that its disc member is positionable in said depression with circumferential edge portions thereof being in sliding retained engagement with said recesses and said lip portions and further being axially pivotable relative thereto,
      (4) said platform plate further having boss means depending from the under surface of said platform plate in the region of said depression for locating and limiting lateral movements of said disc member relative to said platform plate when said disc member is so positioned in said depression,
      (5) said platform plate still further having defined therein an elongated, resilient locking finger which is integral with said platform plate at a root end thereof, and which is separated from said platform plate along the opposed sides and at the forward end thereof, said resilient locking finger being adapted for flexural movements normally relative to said platform plate said root end being located in longitudinally spaced relationship to one side of said depression, and said forward end being located in an adjacent relationship to said depression,
   (F) the interrelationship between said locking finger, said disc member, and the associated components as defined above is such that, when said disc member is so positioned in said depression,
      (1) said disc member is pivotable in said depression when said locking finger is depressed at least sufficiently to permit said forward end thereof to slidably engage the lower surface of said disc member, (2) said disc member is locked against pivotal and other movements relative to said base construction when said bottom portion extends generally across said base construction, said forward end engages said first slot, and said locking finger is in a relaxed configuration, (3) said disc member is yieldingly biased against pivotal and other movements relative to said base construction when said bottom portion extends generally parallelly along said base construction, said forward end engages said second slot and said locking finger is in a relaxed configuration, and (G) the interrelationship between said locking finger, said disc member, said platform plate, and the associated components as defined above is such that (1) when said disc member is so positioned in said depression, and said locking finger is raised at least sufficiently to permit said forward end thereof to slidably engage the upper surface of said disc member, said disc member is pivotable in said depression, (2) said disc member is orientable relative to said platform plate by pivoting same in said depression with said locking finger so raised into a position where said boss means along one hemicircular circumferential region thereof are aligned with edge discontinuities in said disc member, (3) when so positioned, said disc member is translatable laterally relative to said depression to an extent sufficient to permit said disc member to be tiltable relative to said base construction and removable from said recesses and said overhanging lip portions and said base construction, and (4) said disc member, when separated from said base construction, is engagable therewith by so orienting said disc member relative to said platform plate with said locking finger so raised.

2. The signal assembly of claim 1 wherein when said forward end of said finger engages said first slot said bottom portion extends generally normally across said base construction.

3. The signal assembly of claim 1 wherein said boss means along said hemicircular circumferential region comprise two projections, one of which is positioned to abut against said disc member in the region of said first slot, the other of which is positioned to abut against said disc member at an edge discontinuity which is defined in said disc member at a location between said first and said second slots and adjacent said second slot when said disc member is so oriented relative to said platform plate and so translated relative to said depression.

4. The signal assembly of claim 1 wherein said leg members are configured to rest in adjacent relationship to said base construction when said bottom portion extends generally parallelly to said base construction.

5. The signal assembly of claim 4 wherein pockets are defined in said housing for receipt therein of said leg members when said bottom portion extends generally parallelly to said base construction.

6. The signal assembly of claim 1 wherein such spacing between said disc member and said bottom side is not substantially greater than the thickness of said platform plate.

7. The signal assembly of claim 6 wherein said recesses comprise apertures formed in portions of said platform plate on longitudinally opposed mid sides of said depression and said overhanging lip portions are formed of adjacent portions of said platform plate.

8. The signal assembly of claim 1 wherein opposite end portions of said base construction are provided with ground engagable foot members.

9. The signal assembly of claim 1 wherein said ballast means comprises a pair of spaced, parallel metal bars longitudinally extending in said chamber.

10. The signal assembly of claim 1 wherein said sign assembly is a triangular reflectorized warning device.

11. The signal assembly of claim 1 wherein said disc member has generally flat, parallel, opposed upper and lower such surface portions.

* * * * *